(12) United States Patent
Uhrig et al.

(10) Patent No.: US 11,347,437 B2
(45) Date of Patent: May 31, 2022

(54) PROCESSOR SYSTEM HAVING MEMORY INTERLEAVING, AND METHOD FOR ACCESSING INTERLEAVED MEMORY BANKS WITH ONE CLOCK CYCLE

(71) Applicant: Airbus Defence and Space GmbH, Taufkirchen (DE)

(72) Inventors: Sascha Uhrig, Taufkirchen (DE); Johannes Freitag, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 0 days.

(21) Appl. No.: 17/018,470

(22) Filed: Sep. 11, 2020

(65) Prior Publication Data

US 2021/0081146 A1 Mar. 18, 2021

(30) Foreign Application Priority Data

Sep. 13, 2019 (DE) .......................... 102019213998.1

(51) Int. Cl.
*G06F 3/06* (2006.01)
(52) U.S. Cl.
CPC ............ *G06F 3/0659* (2013.01); *G06F 3/061* (2013.01); *G06F 3/0673* (2013.01)
(58) Field of Classification Search
CPC ....... G06F 3/0659; G06F 3/061; G06F 3/0673
See application file for complete search history.

(56) References Cited

U.S. PATENT DOCUMENTS

| | | | | |
|---|---|---|---|---|
| 9,104,531 | B1* | 8/2015 | Shumsky | ................ G06F 13/14 |
| 10,168,938 | B2* | 1/2019 | Chen | ..................... G06F 3/0679 |
| 10,210,043 | B2* | 2/2019 | Kittner | .................. G06F 3/0619 |
| 10,719,237 | B2* | 7/2020 | Sundaram | ............ G11C 7/1042 |
| 2008/0140980 | A1 | 6/2008 | Mei et al. | |
| 2012/0079155 | A1 | 3/2012 | Damondaran et al. | |
| 2016/0188529 | A1 | 6/2016 | Nagarajan et al. | |

FOREIGN PATENT DOCUMENTS

DE 102005053681 A1 5/2007

OTHER PUBLICATIONS

German Office Action; priority document.

* cited by examiner

*Primary Examiner* — Tammara R Peyton
(74) *Attorney, Agent, or Firm* — Greer, Burns & Crain, Ltd.

(57) ABSTRACT

A processor system comprises a memory having at least two interleaved memory banks, at least two multiplexers which are respectively coupled to one of the at least two interleaved memory banks via a respective memory bank bus, a first processor or processor core which is coupled to first multiplexer inputs of the at least two multiplexers via a first data bus, a second processor or processor core which is coupled to second multiplexer inputs of the at least two multiplexers via a second data bus, and at least two queue buffers which are arranged in the second data bus between the second processor or processor core and the second multiplexer inputs of the at least two multiplexers. The first processor or processor core is configured to have read access or write access only to one of the at least two interleaved memory banks within one clock cycle.

6 Claims, 1 Drawing Sheet

PROCESSOR SYSTEM HAVING MEMORY INTERLEAVING, AND METHOD FOR ACCESSING INTERLEAVED MEMORY BANKS WITH ONE CLOCK CYCLE

CROSS-REFERENCES TO RELATED APPLICATIONS

This application claims the benefit of the German patent application No. 102019213998.1 filed on Sep. 13, 2019, the entire disclosures of which are incorporated herein by way of reference.

FIELD OF THE INVENTION

The present invention relates to a processor system having at least two independent processors or processor cores which are able to access interleaved banks of a memory, and an access method for arbitrating accesses to interleaved banks of a memory by at least two independent processors or processor cores, in particular for use in a system on a chip (SoC).

BACKGROUND OF THE INVENTION

In embedded computing systems having electronic computing devices, time-critical and/or safety-critical applications, such as control, monitoring, signal processing, or regulation functions, are frequently executed. Due to the design-related limitation on resources such as energy consumption, installation space, or implementation costs, a single memory which is installed jointly in an embedded system, such as a main memory, random-access memory, or instruction memory, is accessed by a plurality of electronic computing devices of the embedded system.

In such systems having more than one electronic computing device, it is necessary to arbitrate the temporal sequence of the memory access by the various computing devices. Various approaches involve time division multiple access (TDMA), round-robin scheduling, or other prioritization methods having predefinable prioritization parameters.

For example, the publication DE 10 2005 053 681 A1 discloses a method for the utilization of a memory by at least two processors in a multiple-computer device, in which the memory is divided into interleaved banks, and accesses to the memory by the at least two processors are decoupled from one another. This enables a solution without additional cache memory per processor.

The publication US 2012/0079155 A1 discloses various memory access methods for a multicore processor as part of a single-chip system. The publication US 2008/0140980 A1 discloses a hardware memory architecture for multiprocessor systems having memory queues between the computing units and a memory device which the computing units access.

However, there is a need for real time-capable processor systems having at least two independent processors, in which memory accesses are strictly temporally separated, but in which an access bandwidth remains sufficiently large for all processors.

SUMMARY OF THE INVENTION

One of the objects of the present invention is to find improved solutions for processor systems having at least two processors or processor cores, in which the competing memory access to a shared memory resource can be accurately predicted, and of which the timing is accurate.

According to a first aspect of the present invention, a processor system comprises a memory having at least two interleaved memory banks, at least two multiplexers which are respectively coupled to one of the at least two interleaved memory banks via a respective memory bank bus, a first processor or processor core which is coupled to first multiplexer inputs of the at least two multiplexers via a first data bus, a second processor or processor core which is coupled to second multiplexer inputs of the at least two multiplexers via a second data bus, and at least two queue buffers which are arranged in the second data bus between the second processor or processor core and the second multiplexer inputs of the at least two multiplexers. The first processor or processor core is designed to have read access or write access only to one of the at least two interleaved memory banks within one clock cycle.

According to a second aspect of the present invention, a single-chip system comprises a processor system according to the first aspect of the present invention. The memory, the multiplexers, the first processor or processor core, the second processor or processor core, and the queue buffers are implemented on a common chip substrate.

According to a third aspect of the present invention, an access method uses the processor system according to the first aspect of the present invention for arbitrating accesses to interleaved banks of a memory, in particular in a single-chip system. The method comprises the steps of accessing only a first of at least two interleaved memory banks by a first processor or processor core within a first clock cycle, and of simultaneously accessing one or a plurality of second ones of the at least two interleaved memory banks by a second processor or processor core within the first clock cycle. The access to the memory by the first processor or processor core takes place directly, and the simultaneous access to the memory by the second processor or processor core takes place via a first queue buffer which is coupled between the second processor or processor core and the memory.

According to a fourth aspect of the present invention, a single-chip system according to the second aspect of the present invention is used in an embedded system for executing safety-critical applications on the first processor or processor core of the processor system in real time.

A particular advantage in the solutions according to the present invention is that, despite the independent functioning of the two processors or processor cores, there is predictability and timing reliability when the first processor or processor core accesses the memory, as the first processor or processor core always receives priority over the second processor or processor core for the memory access. As compensation therefor, the first processor or processor core can access only one of the interleaved memory banks per clock cycle. Particularly when storing with memory interleaving, this results in the second processor or processor core being able to access a plurality of the memory banks simultaneously per clock cycle in a strictly sequential access manner, if one of the memory banks is not prioritized for the first processor or processor core in this clock cycle.

This provides the advantage that safety-critical and/or time-critical applications can be carried out in the first processor or processor core at any time in a traceable manner and without inaccuracies in the timing, while still leaving enough access bandwidth for the second processor or processor core. Any timing delays caused by the prioritized access of the first processor or processor core are offset for the second processor or processor core by the use of queue buffers (first-in first-out (FIFO) buffers).

As a result of the timing fidelity of the applications in the first processor or processor core, which do not have to take applications executed in the second processor or processor core into consideration, the design of embedded computer systems, for example, for use in safety-critical aeronautical systems or in space technology, is highly simplified, without having to accept losses in the reliability and robustness of the systems.

Advantageous embodiments and refinements result from the further subclaims and from the description with reference to the figures.

According to several embodiments of the processor system, the second processor or processor core may be designed to have read access or write access to a plurality of the at least two interleaved memory banks within one clock cycle. According to several further embodiments of the processor system, the second processor or processor core may be designed, in the case of a read access to one of the at least two interleaved memory banks, to buffer the read-out data content in the respective one of the at least two queue buffers, and in the case of a write access to one of the at least two interleaved memory banks, to remove the data content which is to be written from the respective one of the at least two queue buffers in a sequential order. When performing sequential memory access, this enables the second processor or processor core still to keep the queue buffers sufficiently full during the read operation and to clear them in a timely manner during the write access.

According to several further embodiments of the processor system, the first processor or processor core may be designed to transmit a control signal, enabling the access by the first processor or processor core, to a control input of the one of the at least two multiplexers which is associated with the interleaved memory bank to which the first processor or processor core requires access, within one clock cycle. As a result, the first processor or processor core can autonomously control whether and to what degree a direct access to the desired memory bank takes place in the respective clock cycle, without having to take the execution of applications in the second processor or processor core into consideration.

According to several further embodiments of the processor system, each of the at least two queue buffers may have a first queue for data which is read out of the associated interleaved memory bank, and a second queue for data to be written into the associated interleaved memory bank.

According to several embodiments of the memory access method, an access by the first processor or processor core can take place only to a second of the at least two interleaved memory banks within a second clock cycle following the first clock cycle, and a simultaneous access by the second processor or processor core can take place to the first of the at least two interleaved memory banks within the second clock cycle. The access to the memory by the first processor or processor core within the second clock cycle can take place directly, and the simultaneous access to the memory by the second processor or processor core within the second clock cycle can take place via a second queue buffer which is coupled between the second processor or processor core and the memory.

The embodiments and refinements mentioned above may be combined in any arbitrary manner, as appropriate. Further possible embodiments, refinements, and implementations of the present invention also comprise combinations, which are not explicitly mentioned, of features of the present invention which have been previously described or which are described below with respect to the exemplary embodiments. In particular, those skilled in the art will also add individual aspects as improvements or refinements to the respective basic form of the present invention.

BRIEF DESCRIPTION OF THE DRAWINGS

The present invention will be described in greater detail below, based on the exemplary embodiments specified in the schematic figures. The following are shown.

Figure 1:
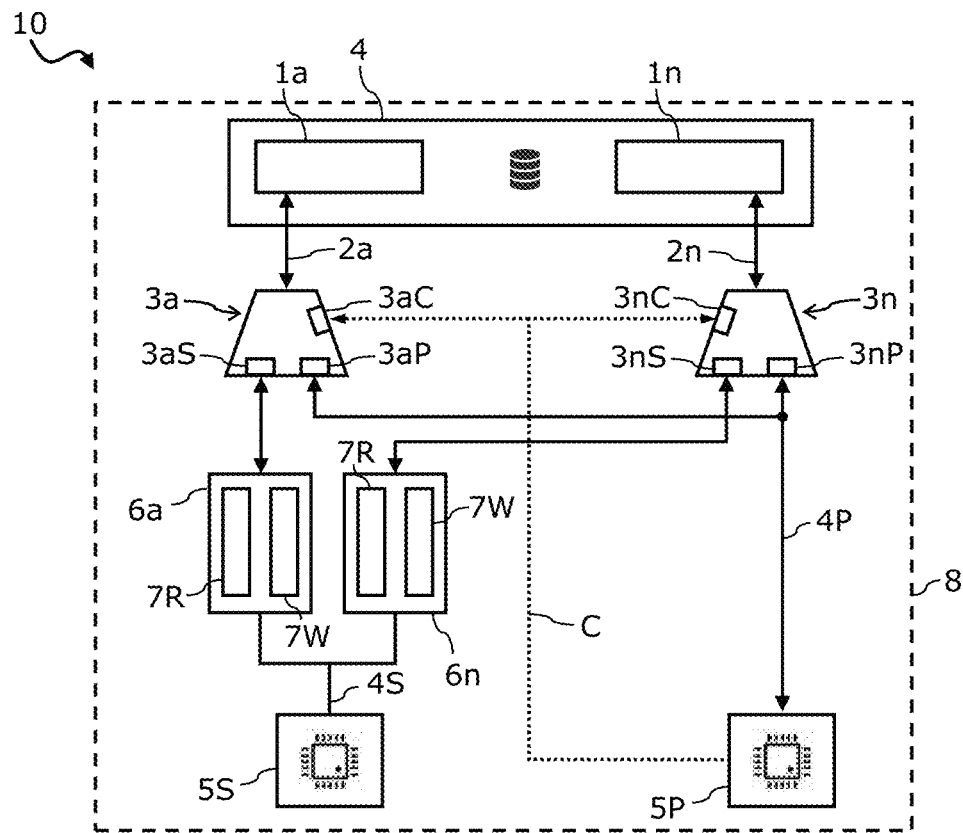
FIG. 1 shows a schematic block diagram of a processor system in a single-chip system, according to one embodiment of the present invention.

The attached figures are intended to convey further understanding of the embodiments of the present invention. They illustrate embodiments and are used in conjunction with the description for explaining principles and concepts of the present invention. Other embodiments and many of the aforementioned advantages result with respect to the drawings. The elements of the drawings are not necessarily true to scale with respect to one other. Terminology specifying directions such as "above," below," "left," "right," "over," "under," "horizontal," "vertical," "in front," "behind," and similar specifications, are used solely for the purposes of illustration, and are not intended to limit the generality to specific embodiments as shown in the figures.

In the figures of the drawing, identical, functionally identical, and identically acting elements, features, and components are respectively provided with the same reference characters, unless stated otherwise.

DETAILED DESCRIPTION OF THE PREFERRED EMBODIMENTS

In the following description, reference is made to processor systems which can be configured in a multicore architecture. Typically, such processor systems may be implemented in a single system on chip (SSoC). As used here, the term "core" or "processor core" refers to an electronic processing or computing module which may contain a command processor, for example, a digital signal processor (DSP) or another microprocessor type, and one or a plurality of cache levels which are closely connected to the processor.

FIG. 1 shows a block diagram depiction of an exemplary schematic illustration of a processor system 10. The processor system 10 may, for example, be used in a single system on chip (SSoC) 8, in which all components are arranged or implemented on a common chip substrate.

The processor system 10 comprises a memory 1 having at least two interleaved memory banks 1a, 1n. In memory interleaving, sequential addresses are divided into a number of cyclically consecutive memory blocks or memory banks. A physical memory bank does not correspond to a logical memory bank. The low-value bits of the address may, for example, determine the number of the memory bank, while the address portion having the higher-value bits specifies the address within a memory bank. As a result, an acceleration of the memory access may be achieved, since it is possible to access a plurality of portions of the memory operating generally with higher cycle times or latency periods, by means of faster-operating processors or processor cores.

Since consecutive addresses are in consecutive and thus different memory banks, memory access cycles may overlap temporally. For this purpose, in the case of jumps or branches by an accessing processor, it may be necessary or expedient to avoid repeated access queries to addresses within the same memory bank in consecutive clock cycles. This may, for example, be countered by static or dynamic jump or branching prediction tools (such as stall/freeze, branching delay, branch target buffer with or without call return stack, or taken/not taken prediction), in order to be able to detect jumps or branches along a processing chain, along with their target addresses, as early as possible. Alternatively, in the case of jumps or branches, it may also even be attempted by means of the application design to leave out clock cycles deliberately (delay by design).

In FIG. 1, two interleaved memory banks $1a$, $1n$ are depicted for the sake of clarity, but any arbitrary number is possible, in particular powers of two. Accordingly, the number of multiplexers and queue buffers increases according to a chosen number of interleaved memory banks $1a$, $1n$.

The processor system 10 comprises at least two multiplexers $3a$, $3n$, which are respectively coupled to one of the interleaved memory banks $1a$, $1n$ via a respective memory bank bus $2a$, $2n$. The multiplexers $3a$, $3n$ have a number of multiplexer inputs which respectively correlate with the number of processors or processor cores accessing the memory 1. In the example of FIG. 1, two processors or processor cores (hereinafter referred to as "processor") are depicted, such that each multiplexer $3a$, $3n$ has two data inputs and outputs.

A first processor 5P is coupled to first multiplexer inputs $3a$P, $3n$P of the two multiplexers $3a$, $3n$ via a first data bus 4P, while a second processor 5S is coupled to second multiplexer inputs $3a$S, $3n$S of the two multiplexers $3a$, $3n$ via a second data bus 4S. The first and second data buses 4P and 4S are strictly isolated from one another, so that the processor to which the multiplexed data content belongs is clear at all times.

The first processor 5P performs a read or write access only to one of the at least two interleaved memory banks $1a$, $1n$ within one clock cycle, but directly. The first processor 5P operates in the arbitrary access mode, i.e., the applications of the first processor 5P can choose freely between the memory banks $1a$, $1n$ per clock cycle. For this purpose, the first processor 5P can output control signals C to the control inputs $3a$C, $3n$C, which grant priority to the first data bus 4P for the chosen memory bank $1a$, $1n$ in the respective clock cycle. In order to equalize the clocking of the memory access by the first processor 5P, it may be advantageous to read two or a plurality of instructions out of the memory, or to write them into the memory, per access cycle. Thus, multiple time slots remain left over per clock cycle for a second processor 5S, in order for it to read or to write instructions: two time slots for the memory bank not selected by the first processor 5P, and additional time slots for the memory bank selected by the first processor 5P, which becomes free for further memory access due to the higher fetch rate of the first processor 5P.

The second processor 5S is therefore connected to the second multiplexer inputs $3a$S, $3n$S via two queue buffers $6a$, $6n$ in the second data bus 4S. In the case of a read access to one of the interleaved memory banks $1a$, $1n$, the second processor 5S reads the read-out data content into the respective queue buffer $6a$, $6n$ for sequential buffering. In the case of a write access to one of the interleaved memory banks $1a$, $1n$, the data content to be written is removed from the respective one of the queue buffers $6a$, $6n$ in a sequential order. Thus, each of the queue buffers $6a$, $6n$ may have a first queue 7R for data which is read out from the associated interleaved memory bank $1a$, $1n$, and a second queue 7W for data to be written into the associated interleaved memory bank $1a$, $1n$ By means of the queue buffering, the second processor 5S can perform a read access or write access to a plurality of the interleaved memory banks $1a$, $1n$ simultaneously within one clock cycle. The queue buffers (first-in first-out, FIFO) are buffers for compensating for differences in the processing speed. It is possible to compensate for delays or forced pauses in the processing by caching data which are to be processed. The queue buffers may, for example, be designed as hardware-implemented ring buffers and may, for instance, have a buffer memory size of four entries.

Figure 2:
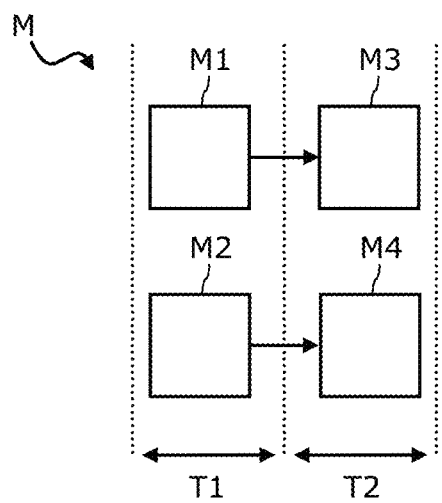
FIG. 2 shows a flow chart of a method for arbitrating accesses to interleaved banks of a memory, according to another embodiment of the present invention.

FIG. 2 shows a method M for arbitrating accesses to interleaved banks of a memory, in particular for use in a single-chip system. The method M may, for example, be used in a processor system 10 as depicted in FIG. 1. The method M may be implemented in a single-chip system 8 with the aid of the components of a processor system 10 described in conjunction with FIG. 1.

In the first step M1 of the method M, there is an access, which, however, is a direct access, by a first processor or processor core 5P only to a first of at least two interleaved memory banks $1a$, $1n$ within a first clock cycle T1. Simultaneously, in step M2, an access by a second processor or processor core 5S to one or a plurality of second ones of the at least two interleaved memory banks $1a$, $1n$ takes place in the same clock cycle T1. The memory access by the second processor or processor core 5S takes place via a first queue buffer $6a$, $6n$ which is coupled between the second processor or processor core 5S and the memory 1.

In a clock cycle T2 following the first clock cycle T1, in a step M3, a direct access can be made by the first processor or processor core 5P only to a second of the at least two interleaved memory banks $1a$, $1n$, while simultaneously, in a step M4, the second processor or processor core 5S accesses the first of the at least two interleaved memory banks $1a$, $1n$ within the same clock cycle T2, via a second queue buffer $6a$, $6n$ which is coupled between the second processor or processor core 5S and the memory 1.

The memory access behavior of the applications running on the first processor or processor core 5P may be adjusted in such a way, for example, by transposing the instruction sequence or inserting artificial zero access cycles, that the queue buffers for the second processor or processor core 5S are always filled as equally as possible, i.e., the first processor or processor core 5P preferably accesses the different memory banks $1a$, $1n$ in an alternating manner.

In the preceding detailed description, various features were combined in one or several examples in order to improve the rigor of the depiction. However, it should be clear that the above description is merely illustrative, but is under no circumstances restrictive. It serves to cover all alternatives, modifications and equivalents of the various features and exemplary embodiments. Given the above description, many other examples will be immediately and directly clear to those skilled in the art, due to their specialized knowledge.

The exemplary embodiments were selected and described in order to be able to depict the principles underlying the present invention and their potential practical applications in the best possible manner. As a result, specialists will be able to modify and use the present invention and its various exemplary embodiments in an optimal manner with respect to the intended application. In the claims and the description, the terms "containing" and "having" are used as linguistically neutral concepts for the corresponding terms "comprising". Furthermore, use of the terms "a/an" and "one" is not to fundamentally exclude a plurality of features and components described in such a way.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A processor system, comprising:
   a memory having at least two interleaved memory banks;
   at least two multiplexers which are respectively coupled to one of the at least two interleaved memory banks via a respective memory bank bus;
   a first processor or processor core which is coupled to first multiplexer inputs of the at least two multiplexers via a first data bus;
   a second processor or processor core which is coupled to second multiplexer inputs of the at least two multiplexers via a second data bus; and
   at least two queue buffers which are arranged in the second data bus between the second processor or processor core and the second multiplexer inputs of the at least two multiplexers,
   wherein the first processor or processor core is configured to have read or write access only to one of the at least two interleaved memory banks within one clock cycle,
   wherein the second processor or processor core is configured to have read or write access to a plurality of the at least two interleaved memory banks within one clock cycle, and,
   wherein the second processor or processor core is configured, in a case of a read access to one of the at least two interleaved memory banks, to buffer read-out data content in the respective one of the at least two queue buffers, and in a case of a write access to one of the at least two interleaved memory banks, to remove the data content which is to be written from the respective one of the at least two queue buffers in a sequential order.

2. The processor system as claimed in claim 1, wherein the first processor or processor core is configured to transmit a control signal, enabling the access by the first processor or processor core, to a control input of the one of the at least two multiplexers which is associated with the interleaved memory bank to which the first processor or processor core requires access, within one clock cycle.

3. The processor system as claimed in claim 1, wherein each of the at least two queue buffers has a first queue for data which is read out of the associated interleaved memory bank, and a second queue for data to be written into the associated interleaved memory bank.

4. A single-chip system, comprising:
   a processor system as claimed in claim 1, wherein the memory, the multiplexers, the first processor or processor core, the second processor or processor core, and the queue buffers are implemented on a common chip substrate.

5. A method of using the single-chip system as claimed in claim 4 in an embedded system comprising:
   executing safety-critical applications on the first processor or processor core of the processor system in real time.

6. A method for arbitrating accesses to interleaved memory banks of a memory, comprising:
   accessing, by a first processor or processor core, only a first of at least two interleaved memory banks within a first clock cycle,
   simultaneously accessing, by a second processor or processor core, at least a second one of the at least two interleaved memory banks within the first clock cycle,
   accessing, by the first processor or processor core, only of a second of the at least two interleaved memory banks within a second clock cycle following the first clock cycle, and
   simultaneously accessing, by the second processor or processor core, of the first of the at least two interleaved memo banks within the second clock cycle,
   wherein the accessing of the memory by the first processor or processor core takes place directly,
   wherein the simultaneous accessing of the memory by the second processor or processor core takes place via a first queue buffer which is coupled between the second processor or processor core and the memory,
   wherein the accessing of the memory by the first processor or processor core within the second clock cycle takes place directly, and
   wherein the simultaneous accessing of the memory by the second processor or processor core within the second clock cycle takes lace via a second queue buffer which is coupled between the second processor or processor core and the memory.

* * * * *